(12) United States Patent
Twist

(10) Patent No.: US 10,747,590 B2
(45) Date of Patent: Aug. 18, 2020

(54) APPLICATION LOGGING ADAPTERS

(71) Applicant: Facebook, Inc., Menlo Park, CA (US)

(72) Inventor: Jonjo Twist, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 238 days.

(21) Appl. No.: 15/644,686

(22) Filed: Jul. 7, 2017

(65) Prior Publication Data
US 2019/0012217 A1 Jan. 10, 2019

(51) Int. Cl.
*G06F 9/54* (2006.01)
*G06F 11/30* (2006.01)
*G06F 9/445* (2018.01)
*G06F 11/34* (2006.01)

(52) U.S. Cl.
CPC .......... *G06F 9/542* (2013.01); *G06F 9/44526* (2013.01); *G06F 9/541* (2013.01); *G06F 11/302* (2013.01); *G06F 11/3065* (2013.01); *G06F 11/3466* (2013.01); *G06F 2201/86* (2013.01); *G06F 2209/544* (2013.01)

(58) Field of Classification Search
CPC ...... G06F 9/542; G06F 9/44526; G06F 9/541; G06F 11/302; G06F 11/3065; G06F 11/3466; G06F 2201/86; G06F 2209/544
See application file for complete search history.

(56) References Cited

U.S. PATENT DOCUMENTS

2013/0332424 A1* 12/2013 Nos ............. G06F 16/1734 707/687
2019/0026163 A1* 1/2019 Subbiah .............. G06F 9/542

* cited by examiner

*Primary Examiner* — Doon Y Chow
*Assistant Examiner* — Kimberly L Jordan
(74) *Attorney, Agent, or Firm* — FisherBroyles, LLP

(57) ABSTRACT

Embodiments for managing, serving, and applying logging adapters for applications are described. An administrator for an application can establish mappings between the application and adapters that handle log events from the application. When the application executes, it can get these mappings and use them to obtain the corresponding adapters. The adapters can have a configuration function and a logging function. The configuration function can be executed once per-execution of the application to establish a global state for the logging function of that adapter. The configuration function can receive configuration data provided with the mappings. Thereafter, as the application generates log events, they can be passed to the logging functions of the mapped adapters, which execute to perform logging such as analytics functions, on the events, whether locally or by sending the events to third parties.

20 Claims, 7 Drawing Sheets

APPLICATION LOGGING ADAPTERS

BACKGROUND

Many industries rely on logging application events to gather data about the operation of the application, how the application reacts to various environments, and how users interact with the application. Often such logging isn't built into an application itself, but instead uses separate interfaces to integrate analysis tools into the application. This integration has typically required programmers to setup connections between the application and one or more analysis tools.

If an analysis tool changes, if it is desired that additional analysis tools be connected to the application, if a configuration of an analysis tool needs to be modified, or if there is another reason to change the way an application logging is performed, the application itself may need to be modified. This requires a skilled programmer to modify the application code. Furthermore, where the application is distributed to other users, this requires time and consumes network resources for the updated application to be distributed.

For example, in a software development company that produces a "codeMe!" mobile application, the codeMe! application can initially be distributed without any event logging functionality. At some point, the head of licensing may determine that, to effectively partner with other companies, she needs users statistics for codeMe! An engineering team is assembled that adds a logging configuration for Google Analytics® to codeMe! The updated version of codeMe! is released to the Android® and Apple® app stores, and as users slowly get the new version, logging data starts to come in. Shortly thereafter, a project manager determines that to maximize an upcoming project, Adjust® analytics would be really helpful. Unfortunately, adding this additional analytics service would require too much engineering resources and, because the entire updating process would have to occur again, sufficient logging results would not be available in time to advance the project, so no new analytics are added and a less effective product is produced.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
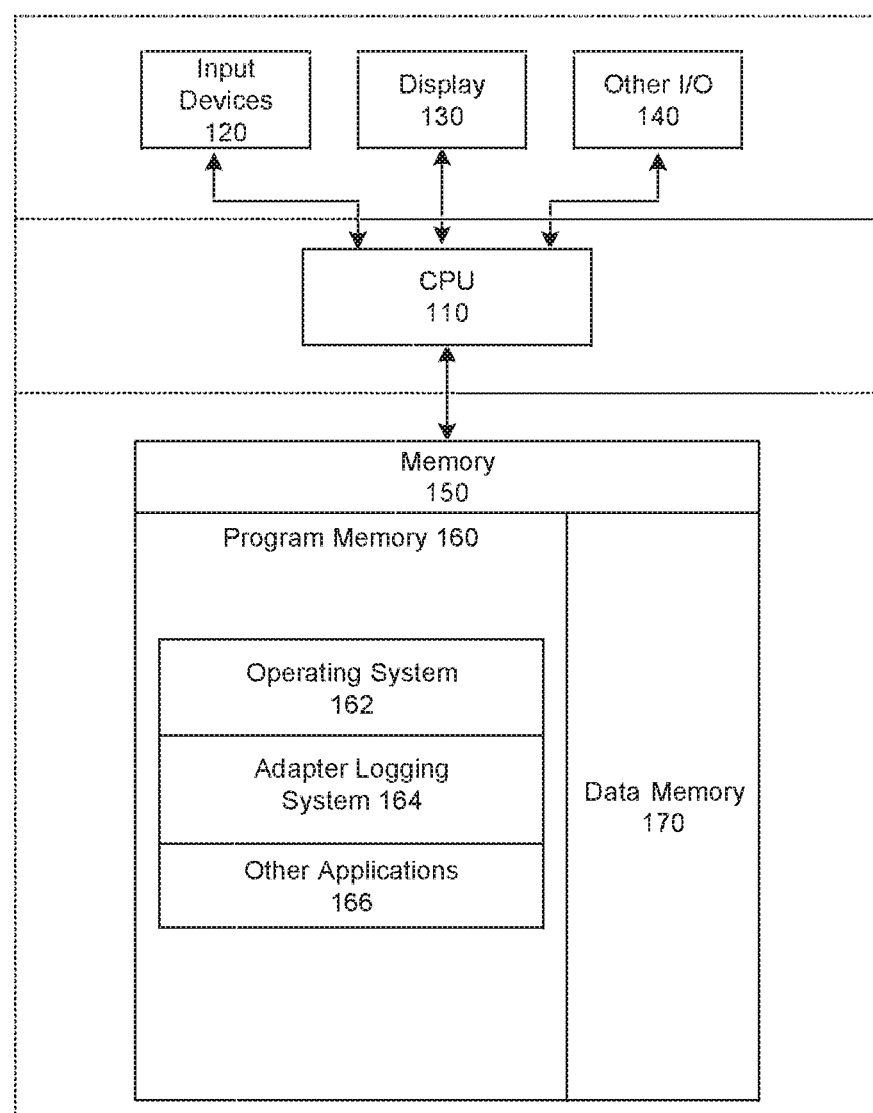
FIG. 1 is a block diagram illustrating an overview of devices on which some implementations can operate.

Embodiments for managing, serving, and applying logging adapters for applications are described. An application, also referred to herein as an "app," can be any executable instruction set such as a traditional desktop application, a mobile device application, a web or server based application, a script, etc. A "logging adapter" or "adapter," is a utility that can perform logging (e.g. storing, analytics, reporting, projections, etc.) of data from events generated by an application. This logging can be performed by a logging function of the adapter. In various implementations, the logging function can store the data from events or send it to a third party, perform analytics on the data, use the data to gather additional data, or triggering other events based on the data. For example, a logging adapter can be an interface that aggregates user actions identified in events into a profile and sends the profile to a log server to store or generate reports on the data. As another example, a logging adapter can be an interface to a third party analytics system such as Google Analytics®. Such a third party interface can format the event data for the third party system and transmit the formatted data. Adapters can be created, e.g., by an entity that produced the application or a third party such as an analytics provider, the open source community, etc. Where an application produces standardized events, the adapter can be a generic interface that multiple applications can use to interface with an analytics service.

In some implementations, an adapter can include a configuration function that can establish a global state for future logging operations. In some implementations, the global state can be based on a configuration payload provided to the configuration function. A configuration payload can include: settings for the adapter, access codes for third party services (e.g. API keys), a specified destination for logging data, rules specifying which events to respond to or how to handle particular event types, or other configuration data. The global state can setup variables that inform how executions of the logging function for that adapter operate.

An application can be configured to use adapters by including a call to an adapter module. For example, the application can make a call to the adapter module as part of the application being initialized. The adapter module can determine which adapter or adapters are assigned to the application, retrieve the assigned adapters, and execute the configuration function for each assigned adapter. As the application produces events, each adapter assigned to the application can call the adapter's corresponding logging function, passing it data from the event.

The computing system that executes the application can obtain, from a mappings server, the mappings of adapters to the application. The computing system can obtain these mappings, e.g. when the application is installed, when the application is initiated, as a push from the mappings server when the mappings at the server change, on a set schedule, or etc. These mappings can include the adapter or a link (e.g. a URI, IP, etc.) to a network resource from which the adapter can be obtained. The computing system can activate this link to retrieve the adapters when the mappings are received, each time the application executes, on a schedule, or etc. The computing system can store the retrieved adapters in an adapter cache, and the links can be used to check if an adapter in the cache needs to be updated (e.g. based on version numbers) each time an adapter is executed, as a push from an adapter repository when an adapter changes, on a schedule, or etc.

The mappings server can store mappings between applications and adapters, e.g. in a mappings database. The mappings server or another system can provide an adapter management utility that provides an interface, on a client device, for an application administrator to set the mappings, in the mappings database, that will control which adapters the application will use. The adapter management utility allows an administrator of an application without specialized programming knowledge to unilaterally manage which logging functions and analytics services are performed by all instances of that application. The adapter management utility can include a listing of available adapters for particular applications or for applications with particular event types. For example, a user of an adapter management utility can specify an application that he administers and the adapter management utility can provide corresponding available adapters that can be selected for that application. The adapter management utility can include controls for a user to specify either or both of an identification of an application previously unknown by the adapter management utility or an identification of an adapter previously unknown by the adapter management utility. When specifying a previously unknown adapter, the user can supply the adapter or can specify a link to an adapter repository where the adapter can be obtained. In some implementations, when a user selects an adapter, a meta-descriptor associated with the adapter can specify configuration data that is needed to use the adapter. The data required by the meta-descriptor can be stored with the mapping in the mappings database to be provided, with the mappings, to the computing system executing the application. This data can be used as the configuration payload to pass to the configuration function of the corresponding adapter.

The disclosed technology for utilizing adapters improves software development and other technologies where analytics or other logging software are applied to application events. Presently, adding software application logging requires a programmer to setup a connection between the application and each desired logging system. If the logging configuration for the application needs to be changed, additional programmer time is needed, plus the updated application has to be redistributed to users, wasting time, consuming network resources, and delaying the availability of updated logging results. The disclosed technology provides for adding and updating application logging that can be implemented with less programming, provides logging results much more quickly, and significantly reduces the network resources required to implement.

For example, in the codeMe! example included in the background section above, a single standard instruction can be initially added to the codeMe! initialization and/or installation procedure to call an API to check the mappings server for adapters mapped to the codeMe! application. This can significantly reduce the programming resources required to initially add event logging to the application and can also reduce the size of the application because additional logging configuration code is not needed, saving storage and network resources. Continuing with the codeMe! example, when the head of licensing wants to add analytics, instead of having to get engineers to update the codeMe! source code, the head of licensing, given the proper credentials, can log into an adapter management utility to select a Google Analytics® adapter that was written for another program that produced the same events as the codeMe! application. This mapping can be stored by the mappings database and used to cause existing codeMe! applications to immediately start logging events through Google Analytics®. This again saves programming resources, distribution time, and provides immediate results. In addition, because the codeMe! application is 50 MB and has one million users (mobile applications, for example, can often be tens or even hundreds of megabytes and can have billions of users), not having to redistribute the updated version of the application saves 50 terabytes of network capacity! When the project manager wants to add the Adjust® analytics to codeMe!, not only is this now feasible, similar savings are realized again.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that utilizes logging adapters. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, adapter logging system 164, and other application programs 166. Memory 150 can also include data memory 170 that can include app-to-adapter mappings, event data whether logged or to be logged, adapters, an adapter management utility, adapter configuration payloads, other configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
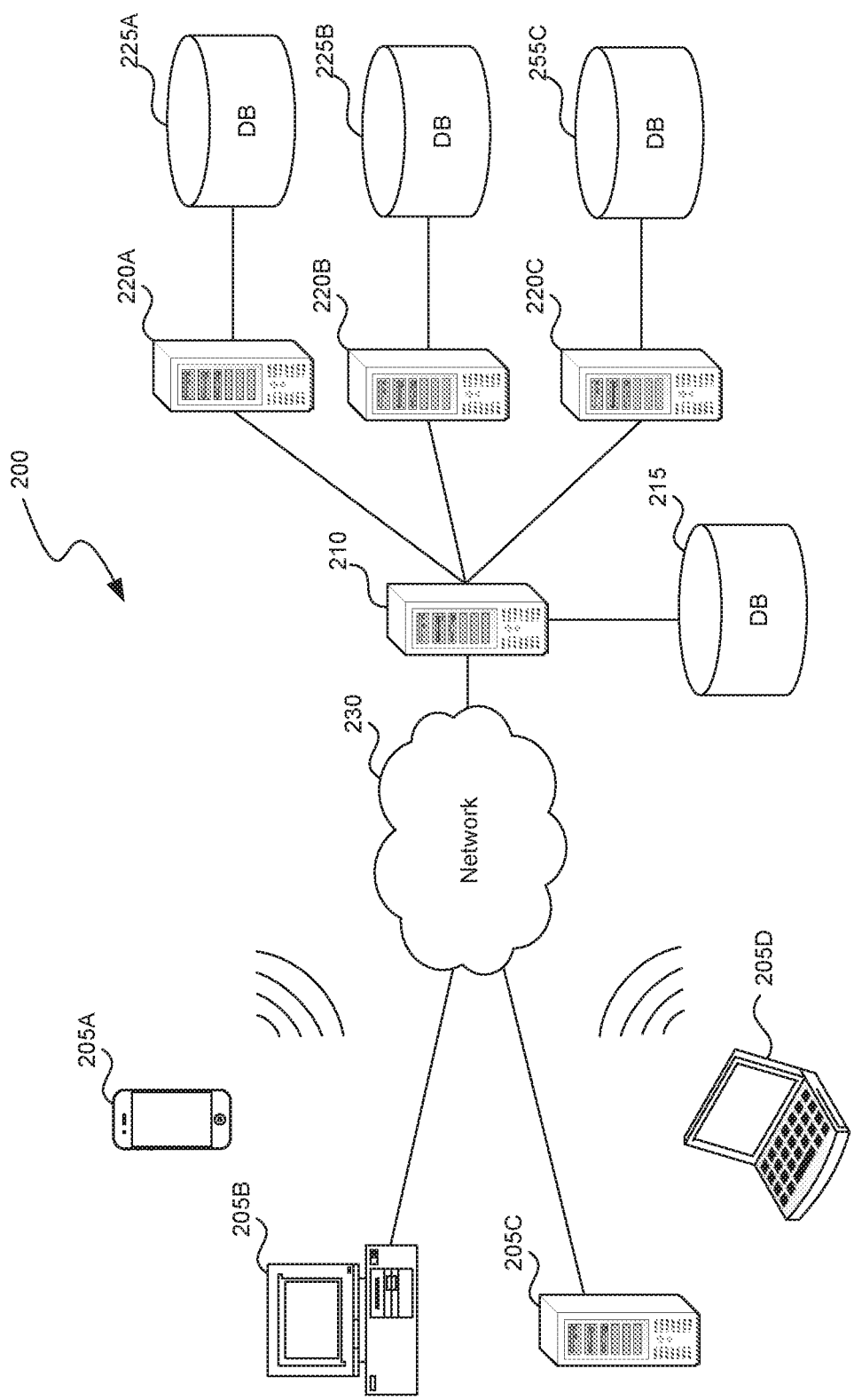
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information (e.g. app-to-adapter mappings, adapters, adapter configurations, etc.). Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
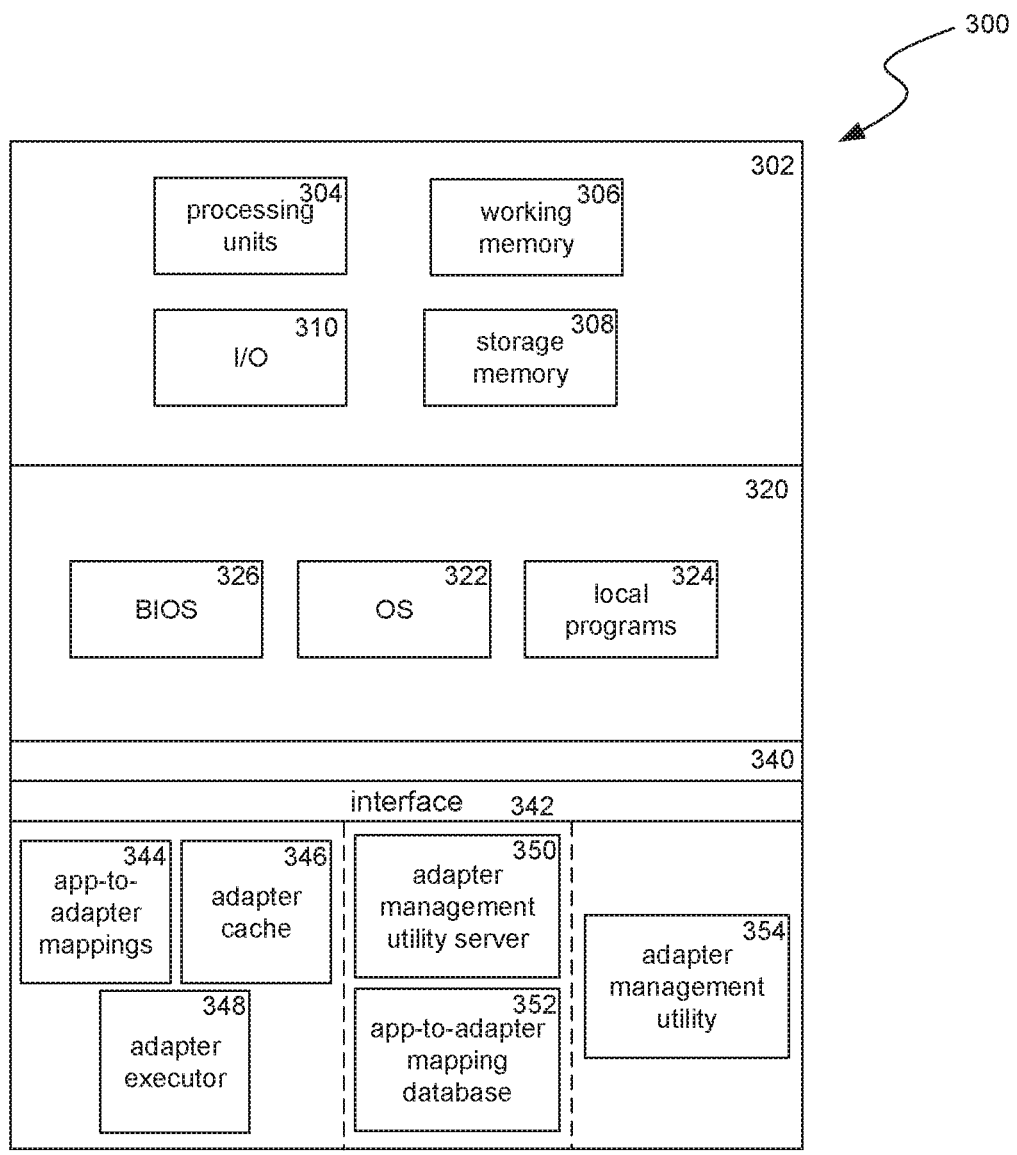
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include local app-to-adapter mappings 344, adapter cache 346, adapter executor 348, adapter management utility server 350, app-to-adapter database 352, adapter management utility 354, and components which can be used for transferring data and controlling the specialized components, such as interface 342. In some implementations, components 300 can be in a computing system that is distributed across multiple computing devices or can be an interface to a server-based application executing one or more of specialized components 340. As demonstrated by the dashed lines, in some implementations, local app-to-adapter mappings 344, adapter cache 346, and adapter executor 348 can be on a first computing system; adapter management utility server 350 and app to adapter database 352 can be on a second computing system, and adapter management utility 354 can be on a third computing system. However, in some implementations, these components can be arranged on additional system or can be distributed across these systems in a different manner.

App-to-adapter mappings 344, can be mappings that associate a particular application (e.g. one of local programs 324) to a particular adapter. These mappings can be stored by the computing system that will execute the application. These mappings can be obtained from app-to-adapter database 352, stored by a second computing system (e.g. an adapter mappings server), e.g. through a network accessed via interface 342. In some implementations, these mappings can be obtained when an application is installed or executed. Obtaining these mappings can be the result of an instruction included in the application or application installer to contact the second computing system to obtain the mappings. In some implementations, some app-to-adapter mappings 344 can include a link to an adapter repository where the adapter is stored. The adapter repository can be on the second computing system or anther computing system. In some implementations, some of the app-to-adapter mappings 344 can include a configuration payload that includes information to be used to configure the adapter identified in the mapping. When an application executes, the system can determine if any of the app-to-adapter mappings 344 match the executed application. If so, the adapter identified in the matched mapping can be obtained, e.g. from adapter cache 346 if it has a current version of the adapter, or if not, from the adapter repository identified by the link in the matched mapping. The obtained adapters can be provided to adapter executor 348 for execution.

Adapter cache 346 can locally store, on the first computing device, adapters obtained from the adapter repository. In some implementations, the adapters include one or more java, javascript, c, c++, c#, perl, php, basic, or other files or executables which can be stored in local memory. In some implementations, the stored adapters can include at least a configuration function and a logging function. As discussed above, at some point the system can identify a set of adapters for an application based on the app-to-adapter mappings 344. When the system obtains the identified adapters, they can be stored in adapter cache 346 so that the adapters don't need to be retrieved from the adapter repository each time they are needed. In some implementations, instead of retrieving an adapter each time it is needed, just the adapter version can be checked to make sure the version in the adapter cache (e.g. based on a version number, hash of the adapter, etc.) is current. In some implementations, this checking can be performed on a periodic basis. In some implementations, when obtaining an adapter from the adapter repository, the computing system can register itself with the adapter repository. When an update to an adapter occurs, the adapter repository can push the updated adapter to devices it has registered for that adapter.

Adapter executor 348 can receive the adapter from an adapter repository or adapter cache 346 and can execute the adapter. In some implementations where the adapters include a configuration function, executing the adapter can include first executing the configuration function of the adapter. In some implementations, executing the configuration function can set variables; retrieve data; establish connections with other software, computing systems, or services; or perform other configuration tasks that establish a global state for the later execution of a logging function of the adapter. In some implementations, executing the configuration function can include receiving a configuration payload that is associated with the mapping of the application to this adapter. In some implementations, using the configuration function to establish a global state is only performed once, e.g. in response to the application being initialized. Part of executing an adapter can also include a call to a logging function of the adapter for various events that the application produces. In some implementations, data for each event can be pass to the logging function of each adapter mapped to the application. In some implementations, events can be selectively passed to the logging functions of certain adapters, e.g. based on types of events assigned to various adapters such as in the mapping of the application to an adapter or the adapter's global state. The logging function of an adapter can perform various logging actions with the event data, such as storing it in a database, performing analytics on it, sending it to another computing system for further processing, or etc.

Adapter management utility server 350 can provide adapter management utility 354 to a client device. Adapter management utility 354, for example, can be a traditional application or a user interface provided for use in a browser (e.g. a website). In some implementations, while adapter management utility 354 itself can be provided from another source (e.g. an app store), adapter management utility 354 can still connect to and manage mappings in the app-to-adapter mapping database 352. In some implementations, serving an adapter management utility can include receiving an indication of one or more applications associated with a current user, identifying available adapters that can be matched to those applications, and providing an interface that lets a user select, for each application, which of the available adapters should be mapped to that application. In some implementations, serving an adapter management utility can include providing options for a user to specify a new application or a new adapter for an application.

In some implementations, third parties can create adapters for various applications, for applications with a particular events, or for particular logging services. They can store the adapter in an adapter repository and inform the adapter management utility server 350 of the adapters availability and what applications it can be used with or which logging services it connects to or provides. Adapter management utility server 350 can then identify these adapters as options, for corresponding applications, to administrators of those applications when they obtain the adapter management utility.

App-to-adapter mapping database 352 can store mappings, provided from adapter management utility 354, and provide them to app-to-adapter mappings 344. In various implementations, a mapping stored in app-to-adapter mapping database 352 can include any of: an identification of an application, an identification of an adapter, the adapter, a configuration payload for the adapter, or a link to a network resource where the adapter can be obtained.

Adapter management utility 354 is an interface with controls for managing the mappings in app-to-adapter mapping database 352. In some implementations, adapter management utility 354 can be executed on a client, e.g. as a webpage or application. In some implementations, the client can receive adapter management utility 354 from adapter management utility server 350. The adapter management utility can include appropriate programming, such as function calls or database queries, that can cause selected application-to-adapter mappings to be sent to the app-to-adapter mapping database 352.

In various implementations, adapter management utility 354 can include controls that allow a user to setup a user account, register a new application with the system, register a new adapter with the system, select mappings between an application and an adapter, or receive configuration data for a selected adapter. Adapters can include a meta-descriptor that specifies what configuration data should be included in a configuration payload to execute the configuration function of that adapter. When an adapter is selected for mapping to an application, adapter management utility can also be configured to receive the data specified in the meta-descriptor for that adapter. For example, an adapter that adds a third-party analytics service to an application though calls to and API can have a meta-descriptor that specifies an API key is needed to setup the adapter. When the adapter is selected in the adapter management utility, the adapter management utility can provide an input to receive the API key. When sending, to app-to-adapter mapping database 352, the mapping of the application to the adapter, the API key provided through the input can be included as a configuration payload to setup the corresponding adapter.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
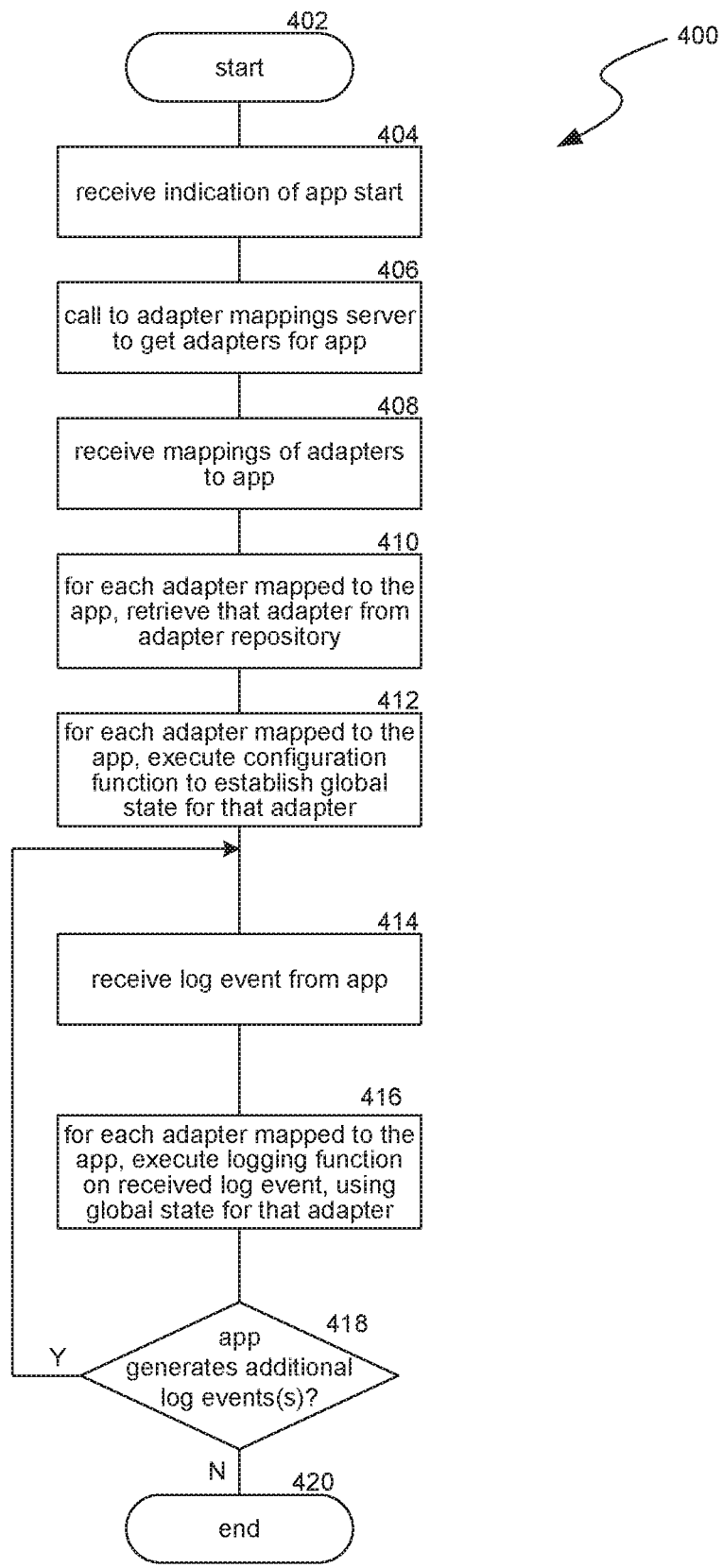
FIG. 4 is a flow diagram illustrating a process used in some implementations for applying logging adapters to an application.

FIG. 4 is a flow diagram illustrating a process 400 used in some implementations for applying logging adapters to an application. Process 400 begins at block 402 and continues to block 404. At block 404, process 400 can receive an indication that an application is executing. This indication can be generated as a result of code included in the application or by a watcher function that monitors for one or more applications to be initiated.

At block 406, process 400 can obtain indications of any adapters that are mapped to the executing application. In some implementations, this can be done by making a call to an adapter mappings server to get the adapters that an administrator for the executing application has mapped to the application (see FIG. 5 and FIG. 6). In some implementations, some of the mappings may already be stored, e.g. in an adapter mappings cache, by the computing system that is executing the application. When mappings are already stored in the computing system, instead of obtaining new mappings, process 400 can use the stored mappings. In some implementations, before using the stored mappings, process 400 can verify that the stored mappings are current, e.g. by determining whether the last time the mappings were updated was more than a threshold amount of time ago, by comparing a count, hash, or version number of the mappings to a count, hash, or version number of mappings stored by the adapter mappings server, or etc. In some implementations, instead of determining whether adapter mappings are up to date, changes to adapter mappings can be pushed to the adapter mappings cache when the adapter mappings change.

At block 408, process 400 can receive the mappings of adapters to the executing application, e.g. from the mappings server or from the adapter mappings cache. In some implementations, the adapter mappings can include a link to a resource where the adapter can be obtained. In some implementations, the received mappings can also include settings or other data for a configuration payload for the corresponding mapped adapter. In some implementations, the mappings can include other criteria for using the mappings, such as a timeframe the adapter should be used, a version of the executing application that the adapter should apply to, or etc.

At block 410, process 400 can obtain the adapters, mapped to the executing application, indicated by the mappings obtained at block 408. In some implementations, adapters can be scripts, e.g. JavaScript files. In some implementations, adapters can include a configuration function or a logging function. In some implementations, process 400 can obtain one or more of the mapped adapters by accessing an adapter repository specified in the link from that mapping. In some implementations, some of the adapters may already be stored, e.g. in an adapter cache, by the computing system that is executing the application. When adapters are already stored in the computing system, instead of obtaining new copies of the adapters, process 400 can use the stored adapters. In some implementations, before using the stored adapters, process 400 can verify that the stored adapters are current. For example, process 400 can determine whether the last time the adapters were updated was more than a threshold amount of time ago or can compare a hash, version number, or etc. to a corresponding value of the adapters stored by the adapter resource linked to by the corresponding mapping. In some implementations, instead of determining whether adapters are up to date, changes to adapters can be pushed to the adapter cache when the adapters change.

As described above, block 404-410 can be done in response to execution of an application. However, in some implementations, some or all of the operations for these blocks can be performed at other points, such as in response to an application being installed or after the application has been executing for some time. In some such cases, instead of obtaining the mappings or adapters, a response to the indication that the application is executing can instead be check whether the mappings or adapters are out of date, and if so, update them.

In some implementations, adapters include a configuration function that can establish a global state for a future execution of a logging function of that adapter. In such implementations, at block 412, process 400 can iterate through the adapters obtained at block 410, operating on a selected adapter in each iteration. In each iteration, process 400 can call the configuration function for the selected adapter. In some implementations, a configuration payload can be stored for a given adapter. For example, values in this configuration payload can be provided by an administrator of the executing application when he established the app-to-adapter mapping(s) and can be stored in association with the corresponding mapping. Stored configuration payloads can be passed to the corresponding configuration function of the adapter. When the configuration function executes, it can gather data that might be needed for the logging function of the adapter, establish a connection or provide credentials to a third party system that the logging function of the adapter may need to use, it can set a state of the computing system for the logging function of the adapter such as by setting variables, starting threads or a virtual machine, or etc. In some implementations, the configuration function for each adapter mapped to the executing application is only executed once per execution of the executing application and the resulting global state is used by all logging function calls by that adapter for that execution of the application.

At block 414, process 400 can receive a log event from or about the executing application. A log event can be any indication of activity related to the executing application such as a user sign-on, an indication of content the user accesses or produces, a fault or exception in the application execution, a state of the executing application, a triggered event configured in the executing application to generate a log event, or etc. In various implementations, log events can be produced by the executing application itself or by another application monitoring the executing application such as the operating system, a compiler, or another application configured to detect activities related to the executing application (e.g. another script running in a browser that is also running the executing application).

At block 416, process 400 can iterate through each of the adapters obtained at block 408; in each iteration executing the logging function for one of the adapters. In some implementations, executing the logging function can include passing data from the log event to the logging function. Depending on the adapter, the logging function can take any action on the data for the log event such as storing it locally or remotely, combining it with data from other log events, performing analytics with it, or sending it to a third-party system for further processing or storage. In some implementations, results of the logging functions can be provided, e.g. through a network to the application administrator that established the app-to-adapter mappings.

Block 418 shows a branch for whether the executing application can generate additional log events. In some implementations, no actual determination of this state is made, but process 400 continues to receive events and pass them to the adapters until the execution application is terminated or reaches a state that will no-longer produce log events. Once the executing application is terminated or reaches a state that will no-longer produce log events, process 400 continues to block 420, where it ends.

Figure 5:
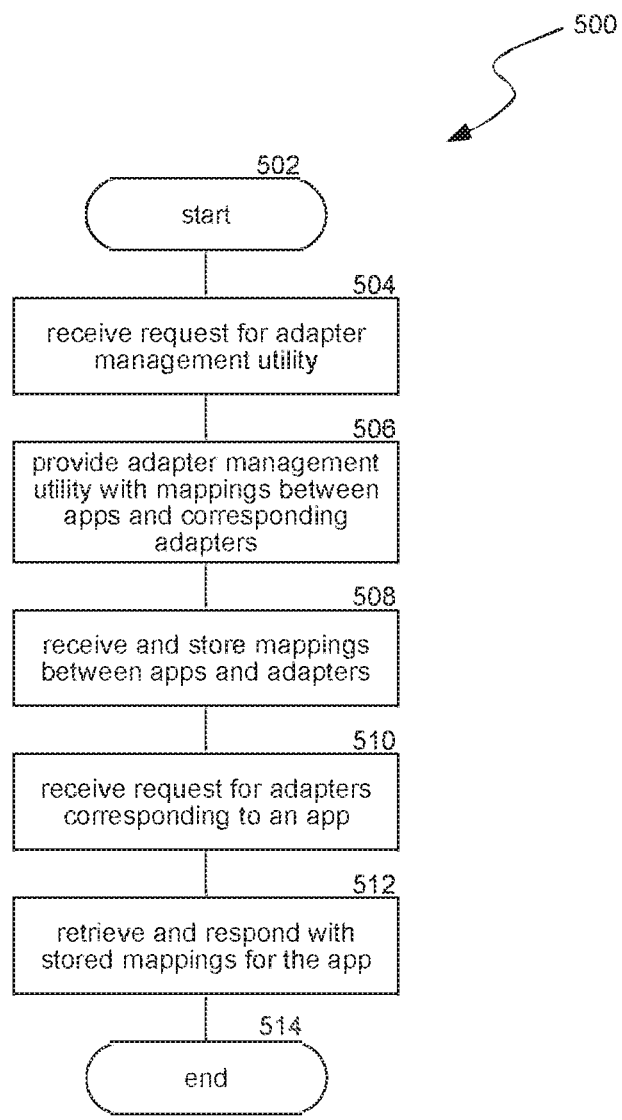
FIG. 5 is a flow diagram illustrating a process used in some implementations for storing and serving mappings between logging adapters and applications.

FIG. 5 is a flow diagram illustrating a process 500 used in some implementations for storing and serving mappings that are between logging adapters and applications. As process 500 is described below, serving an adapter management utility and maintaining a mappings database can be performed by the same computing system. However, in some implementations, different computing systems can perform each of these sets of functions.

Process 500 begins at block 502 and continues to block 504. At block 504, process 500 can receive a request for an adapter management utility. An adapter management utility can be an application that provides an interface to manage mappings between applications and adapters. In some implementations, the adapter management utility can do this by including options for adapters that can be selected for various applications or application types. In some implementations, various of the options for selecting adapters can be provided by third party interaction. For example, a developer (e.g. an open source developer) can code an adapter for a particular application or application type (e.g. application that generates particular types of log events). The developer can provide the adapter, or a link to the adapter, and inform the adapter management utility that the adapter is available for that application or application type. The adapter can then be selected in a mapping for use by others that implement that application or application type.

In some implementations, the adapter management utility includes more flexible inputs that permit a user to specify an application (such as an application name or ID) and identify an adapter for the application (e.g. by providing the adapter or a link to the adapter). In some implementations, the adapter management utility can also receive configuration data for an adapter specified in a mapping. In some implementations, adapters can be associated with a meta-descriptor that defines what configuration data is needed to run the adapter. When an adapter is selected, the meta-descriptor for that adapter defines what input fields are displayed to obtain the configuration data. In some implementations, when selecting an adapter, the user can also specify a link to an adapter repository where the adapter should be obtained when the adapter is run.

At block 506, process 500 can provide the adapter management utility to the requesting computing system. At block 508, process 500 can receive and store mappings between applications and adapters selected through use of the adapter management utility. In some implementations, process 500 can store these mappings is an app-to-adapter database.

At block 510, process 500 can receive a request for mappings of adapters for a specified application. In some implementations, this request can be a response to a computing system executing an application configured to use the adapter system. In some implementations, this request can be from block 406 of process 400. At block 512, process 500 can retrieve the mappings in the app-to-adapter database that specify the application identified in the request and respond to the request by providing the retrieved mappings. Process 500 can then proceed to block 514, where it ends.

Figure 6:
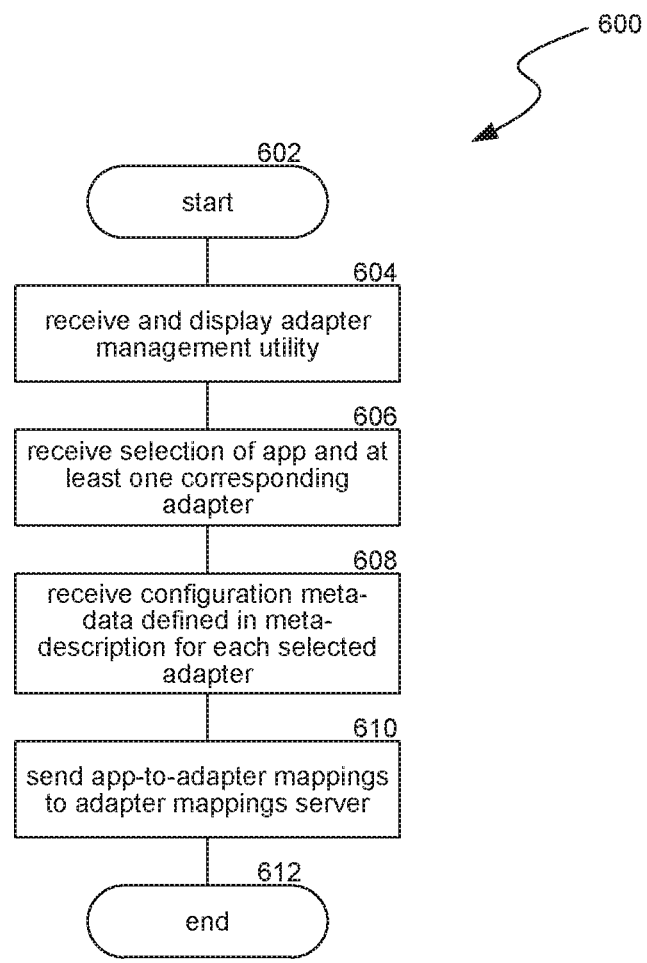
FIG. 6 is a flow diagram illustrating a process used in some implementations for managing mappings between logging adapters and applications.

FIG. 6 is a flow diagram illustrating a process 600 used in some implementations for managing mappings between logging adapters and applications. Process 600 begins at block 602 and continues to block 604. At block 604, process 600 can receive and display an adapter management utility. In some implementations, the adapter management utility can be a requested website, e.g. by entering a URL. In some implementations, the adapter management utility can be an application that directly connects to an app-to-adapter database. In some implementations, the adapter management utility can be received as a result of the operations of block 506 of process 500.

At block 606, process 600 can receive, into the adapter management utility, a selection of an application and at least one corresponding adapter. For example, these selections can be done though text fields where a user enters an identification of an application or a link to an adapter, an upload tool for a user to upload an adapter, a dropdown containing available applications or adapters, or etc.

At block 608, process 600 can receive configuration meta-data defined in a meta-descriptor for each adapter selected at block 606. In some implementations, when an adapter is created, it includes a meta-descriptor that defines what data will be needed to execute the adapter. This can include, for example, API keys or other credentials, configuration data for when or how the logging function should execute, parameters to pass to the logging function, or etc. In some implementations, the meta-descriptor can be obtained from an adapter repository where the adapter is stored. In some implementations, the meta-descriptor can be a default or generic meta-descriptor, e.g. included with the adapter management utility. In some implementations, one or more adapters may not have a meta-descriptor and so the operations of block 608 are not performed.

At block 610, process 600 can send the app-to-adapter mappings from block 606, with the configuration data from block 608, to an adapter mappings server. Process 600 can then continue to block 612, where it ends.

Figure 7:
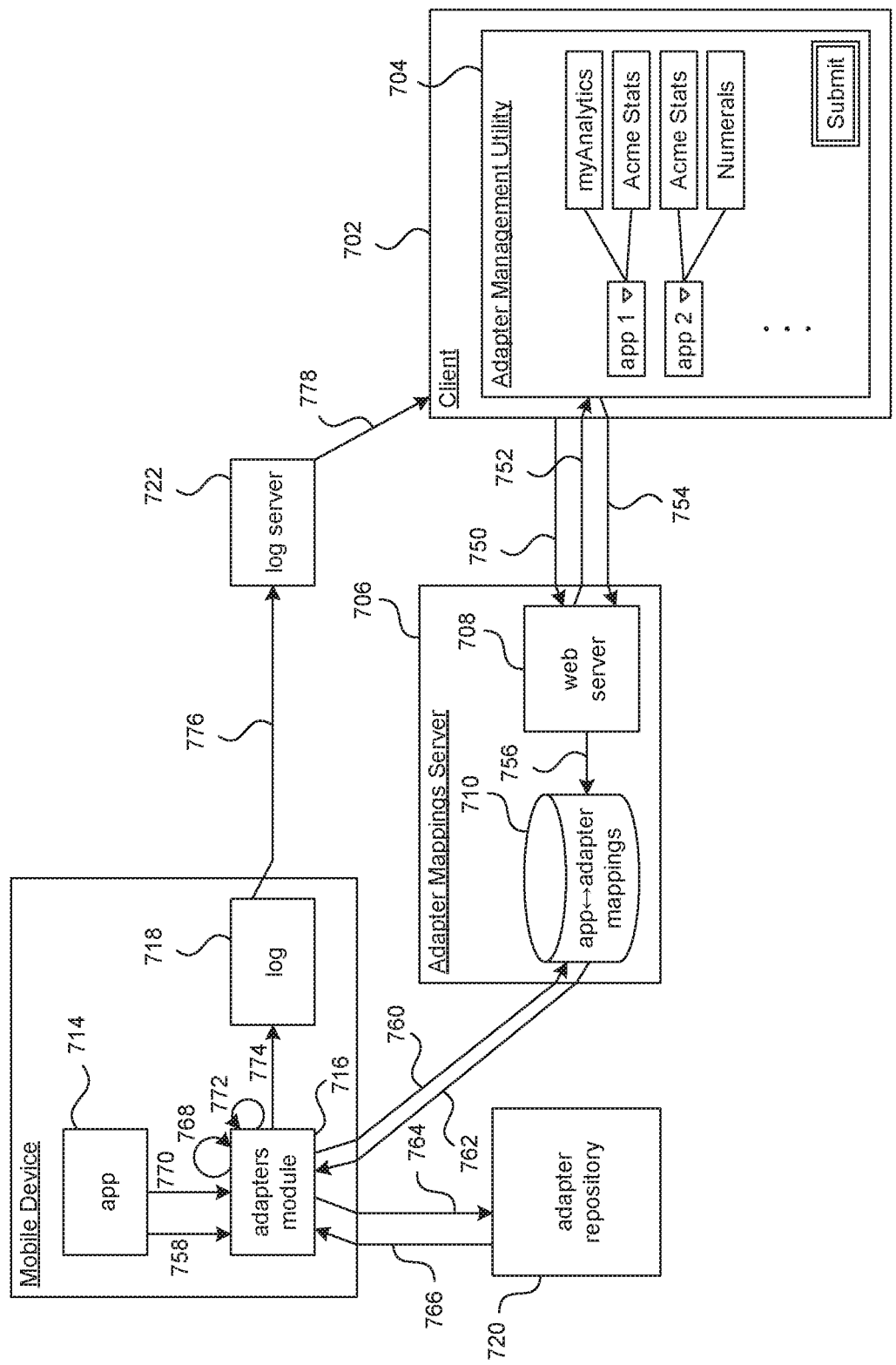
FIG. 7 is an example illustrating a utilization of logging adapters for an application.

FIG. 7 is an example 700 illustrating a utilization of logging adapters for an application. Example 700 includes Client 702 that has Adapter Management Utility 704; Adapter Mappings Server 706 that has Web Sever 708 and App-To-Adapter Mappings 710; Mobile Device 712 that has App 714, Adapters Module 716, and Log 718; Adapter Repository 720; and Log Server 722.

Example 700 begins at 750 with Client 702 making a request to Web Server 708 for an adapter management utility, in this case a web interface that provides inputs to manage the mappings in App-To-Adapter Mappings 710. Web Server 708 responds to the request by providing, at 752, Adapter Management Utility 704. Adapter Management Utility 704 includes several dropdowns that include applications the current user has specified he is the administrator of. Upon selecting an application from the dropdown, a wizard is presented allowing the user to establish mappings between that application and adapters that will work for that application. In example 700, the user has selected app1 from a first dropdown and added two mappings for app1, one to an adapter for an analytics service called myAnalytics and a second for a service called Acme Stats. The user has selected app2 from a second dropdown and has also added two mappings for app2, one for the Acme Stats service and another called Numerals. While not shown, upon selection of each mapping, a meta-descriptor for the selected adapter is obtained and the user is prompted to enter configuration data specified in the meta-descriptor. This configuration data is saved with each mapping. At 754, the four selected mappings are send to the Web Server 708. At 756, Web Server 708 stores these mappings in the App-to-Adapter Mappings 710.

App 714 begins execution on Mobile Device 712, and at 758, an indication of App 714 executing is provided to Adapters Module 716. In response to this indication, Adapters Module 716 obtains a list of adapters mapped to App 714 by sending request 760, for the mappings, to Adapter Mappings Server 706 and receiving the mappings and corresponding configuration data at 762. Adapters Module 716 then obtains all the adapters specified in the received mappings by activating, at 764, the links in each adapter mapping, and in response receiving the adapters at 766. While example 700 shows only a single adapter repository, the links in the mappings can link to different adapter repositories.

At 768, Adapters Module 716 iterates through each of the received adapters and executes that adapter's configuration function to establish a global state for that adapter. This is done by passing the configuration data for the corresponding mapping to the adapter's configuration function.

At 770, App 714 generates an event. At 772, Adapters Module 716 iterates through each of the received adapters and executes that adapter's logging function using the global state for that adapter and passing to that logging function data from the received event. As the logging functions produce results, at 774, they are stored in Log 718. Data from Log 718 is sent, at 776, to Log Server 722. Finally, at 778, data from Log Server 722 is provided to Client 702 where the user who established the app-to-adapter mappings can view the results.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A system for serving mappings between logging adapters and an application, the system comprising:
a memory;
one or more processors;
an interface configured to receive a request for an adapter management utility; and
a utility server configured to, in response to the request, generate and send the adapter management utility; and
a mappings database;
wherein the interface is further configured to:
receive, from user interaction with the adapter management utility, selections of one or more mappings, each between the application and a corresponding logging adapter;
store, in the mappings database, the received mappings;
receive, from a computing system, a request for identifications of logging adapters mapped to the application, wherein the request is in response to the computing system executing the application; and
provide, in response to the request for identifications of logging adapters, one or more adapter indications, from the one or more mappings between the application and the corresponding adapter, stored in the mappings database, wherein each adapter indication includes a link to a network resource for the corresponding logging adapter; and
wherein the computing system:
uses the links from the one or more adapter indications to retrieve the corresponding logging adapters, each logging adapter comprising at least a logging function;
receives an event from the application; and
executes, for each selected adapter of the logging adapters, the corresponding logging function, wherein the executing includes passing, to the logging function, data from the event, wherein executing at least one of the logging functions results in logging results that are available to a user of the adapter management utility.

2. The system of claim 1, wherein generating the adapter management utility includes adding, to the adapter management utility, multiple potential mappings, each of the multiple potential mappings being between the application and a particular logging adapter.

3. The system of claim 2, wherein the received selections of one or more mappings comprise a selection of one or more of the potential mappings.

4. The system of claim 1, wherein the received selections of one or more mappings comprise receiving an entered identification of the application and an entered identification of a particular logging adapter to map to the application.

5. The system of claim 1,
wherein a specific selection, of the selections, identifies a logging adapter associated with a meta-descriptor defining aspects of configuration data needed for that logging adapter;
wherein the adapter management utility is further configured, based on the meta-descriptor, to receive the configuration data with the defined aspects; and
wherein the received specific selection is received in association with the configuration data.

6. The system of claim 5,
wherein at least one of the logging adapters further comprises a configuration function;
wherein providing the one or more adapter indications includes providing, in association with the mapping for the at least one of the logging adapters, the configuration data; and
wherein the computing system further executes the configuration function, passing to the configuration function the configuration data, to produce a global state used in the execution of the logging function of the at least one of the logging adapters.

7. The system of claim 1,
wherein at least one of the logging adapters further comprises a configuration function; and
wherein the computing system further executes the configuration function to produce a global state used in the execution of the logging function of the at least one of the logging adapters.

8. A method, performed by a computing system, for applying logging adapters to an application, the method comprising:
receiving an indication that the application began execution;
obtaining a set of one or more mappings, each mapping identifying a logging adapter for the application;
retrieving the one or more logging adapters identified in the one or more mappings, at least one of the logging adapters comprising at least a configuration function and a logging function;
for each selected logging adapter of the at least one of the logging adapters, executing the corresponding configuration function to establish a global state for the selected logging adapter;
receiving an event from the application; and
for each particular logging adapter of the at least one of the logging adapters, executing the corresponding logging function using the global state for the particular logging adapter, wherein executing the corresponding logging function includes passing data from the event to the corresponding logging function and wherein executing the corresponding logging function produces logging results.

9. The method of claim 8, wherein the set of one or more mappings are obtained from a mappings server that interfaced, with an adapter management utility on a client device separate from the computing system and from the mappings server, to establish the set of one or more mappings.

10. The method of claim 9,
wherein the interfacing to establish the set of one or more mappings included, for at least one of the mappings, receiving associated configuration data; and
wherein the executing the configuration function corresponding to the at least one of the mappings comprises passing, to that configuration function, the associated configuration data.

11. The method of claim 9,
wherein receiving the associated configuration data, for each particular mapping of at least one of the mappings, comprises obtaining a meta-descriptor defining aspects of configuration data needed for the logging adapter identified in that particular mapping; and
wherein the adapter management utility is further configured, based on the meta-descriptor, to receive the configuration data with the defined aspects and associate the received configurations data with that mapping.

12. The method of claim 8,
wherein at least one of the mappings in the set of one or more mappings includes a link to a network resource; and
wherein the retrieving of the logging adapter corresponding to the at least one of the mappings comprises using the link to fetch, from the network resource, the logging adapter corresponding to the at least one of the mappings.

13. The method of claim 8,
wherein executing the logging function, corresponding to at least one logging adapter of the one or more logging adapters, comprises making a call to a service hosted by a separate system from the computing system; and
wherein the logging results that are produced by the executing of the logging function corresponding to at least one logging adapter comprises analytics data generated by the separate system.

14. The method of claim 13,
wherein executing the configuration function to establish a global state for the at least one logging adapter of the one or more logging adapters comprises using an API to establishing a connection to an analytics service provided by the separate system; and
wherein the executing of the logging function corresponding to at least one logging adapter comprises using the established connection to make the call to the analytics service hosted by the separate system.

15. The method of claim 8, wherein at least some of the set of one or more mappings are obtained from a mappings cache, on the computing system, the mappings cache storing mappings of previously used mappings for the application.

16. The method of claim 8, wherein at least some of the one or more logging adapters are obtained from an adapter cache, on the computing system, the adapter cache storing logging adapters previously used for the application.

17. A non-transitory computer-readable storage medium storing instructions that, when executed by a computing system, cause the computing system to perform operations for applying logging adapters to an application, the operations comprising:
receiving an indication that the application is executing;
obtaining, from a first computing device other than the computing system, a set of multiple mappings, each mapping identifying a logging adapter;
retrieving, from a second computing device other than the first computing device and other than the computing system, the one or more logging adapters identified in the one or more mappings, each logging adapter comprising at least a logging function;

receiving an event from the application; and for each selected logging adapter of the one or more logging adapters, executing the corresponding logging function, wherein executing the corresponding logging function includes passing data from the event to the logging function.

18. The non-transitory computer-readable storage medium of claim 17, wherein the event from the application is a first event from the application;

wherein the operations further comprise:

for at least one selected logging adapter of the one or more logging adapters, executing a corresponding configuration function to establish a global state for the selected logging adapter;

receiving a second event from the application; and for each selected logging adapter of the one or more logging adapters, executing the corresponding logging function, wherein executing the corresponding logging function includes passing data from the second event to the logging function; and wherein both executing the logging function corresponding to the selected logging adapter passing data from the first event and executing the logging function corresponding to the selected logging adapter passing data from the second event comprises executing the corresponding logging function using the global state for the selected logging adapter.

19. The non-transitory computer-readable storage medium of claim 17, wherein at least some of the one or more logging adapters are obtained from an adapter cache, on the computing system, the adapter cache storing logging adapters previously used for the application.

20. The non-transitory computer-readable storage medium of claim 17, wherein the computing system is a first computing system and wherein the executing the logging function corresponding to at least one of the one or more logging adapters comprises establishing a connection to a service hosted by a second computing system separate from the first computing system and using the connection to pass the data from the event to the second computing system.

* * * * *